July 28, 1964 W. L. SHEVEL, JR 3,142,825

MAGNETIC COMPUTER ELEMENT

Filed Sept. 18, 1959 3 Sheets-Sheet 1

INVENTOR
WILBERT LEE SHEVEL JR.
BY [signature]
ATTORNEY

July 28, 1964 W. L. SHEVEL, JR 3,142,825
MAGNETIC COMPUTER ELEMENT
Filed Sept. 18, 1959 3 Sheets-Sheet 2
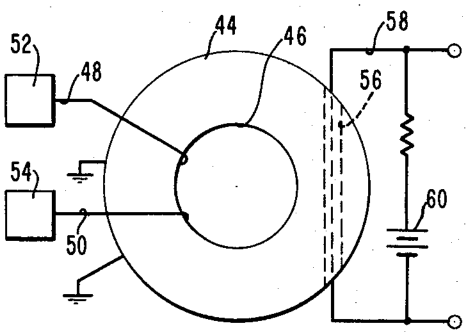
FIG.5
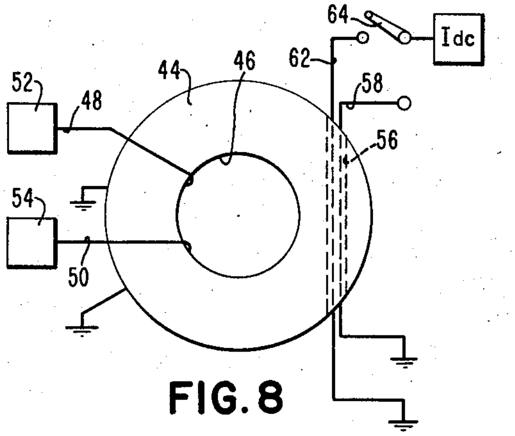
FIG.8
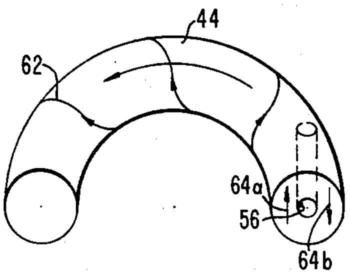
FIG.6a
CLOCKWISE PITCH
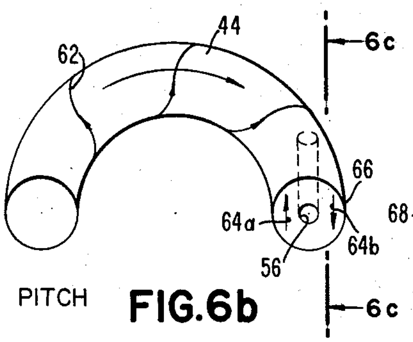
FIG.6b
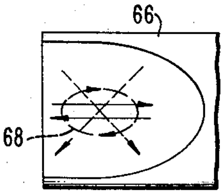
FIG.6c
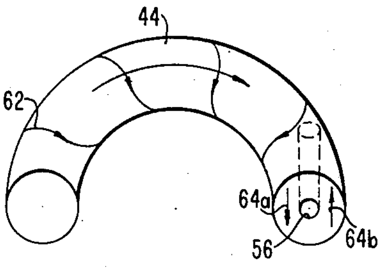
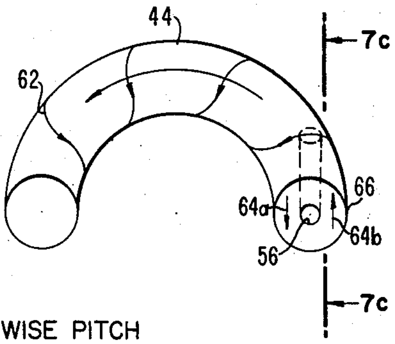
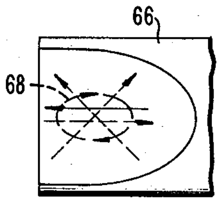
COUNTER-CLOCKWISE PITCH
FIG.7a FIG.7b FIG.7c July 28, 1964 W. L. SHEVEL, JR 3,142,825

MAGNETIC COMPUTER ELEMENT

Filed Sept. 18, 1959 3 Sheets-Sheet 3

United States Patent Office 3,142,825
Patented July 28, 1964

3,142,825
MAGNETIC COMPUTER ELEMENT
Wilbert L. Shevel, Jr., Poughkeepsie, N.Y., assignor to International Business Machines Corporation, New York, N.Y., a corporation of New York
Filed Sept. 18, 1959, Ser. No. 840,862
8 Claims. (Cl. 340—174)

This invention relates to computer elements capable of being utilized in memories and switching circuits and more particularly to a computer element made of magnetic material having different stable residual states of flux density.

Elements made of magnetic material capable of attaining different stable states of flux density have long been recognized as being peculiarly suited for use in data handling systems employing switching circuits and memories wherein the different stable states of the material are arbitrarily referred to as 0 and 1 in representing binary information. In an article entitled, "Observations of Rotational Switching in Ferrites," by W. Lee Shevel, Jr., appearing in the IBM Journal of Research and Development, vol. 3, No. 1, January 1959, pp. 93–95 and an article entitled, "Millimicrosecond Switching Properties of Ferrite Computer Elements," by the same author, appearing in the Journal of Applied Physics, Supplement to vol. 30, No. 4, April 1959, pp. 47S–48S, observed changes in the switching threshold of ferrite materials are described with the realization of high speed operation, greater than those hitherto thought possible for such materials, especially in toroidal core geometries, materially decreasing access and switching time.

The marked decrease observed in the above mentioned articles for the switching threshold of the ferrite material is postulated as due to the onset of rotational flux switching of the coherent rotational mode; that is, a uniform rotation of the magnetization vectors occur within the ferrite.

In order to advantageously employ rotational switching of the coherent rotational mode, a memory element is constructed in accordance with this invention wherein a magnetic toroidal core defining a magnetic flux path made of ferrite material exhibiting a substantially rectangular hysteresis loop is provided having winding means coupled thereto. More particularly a first and a second winding are provided passing through the central aperture of the core and a further multipurpose bias winding is provided centrally located in the material of the core in at least a portion of the total flux path adapted to provide a transverse field to the path and sense a change in flux direction due to coherent rotation of the moments. The first and/or the second winding is utilized to set and/or reset the core from one stable magnetic state, say 0, to the other, the 1 state. The core in switching from one to another of the stable states has its magnetization reversed by the rotational coherent mode described above, setting up a coherent rotational flux pattern in the process of rotation which is detected by the sense winding. The biased sense winding is employed not only to detect coherent rotational flux changes but to provide an orthogonal or transverse field which insures uniform rotation of the magnetization vectors.

Further, it has been found that as the magnitude of the orthogonal or transverse field is increased, the magnitude of the input field applied by the first and/or second input winding may be decreased. Thus, if the input fields are decreased coherent rotational switching does not occur unless the transverse field is applied conjointly therefore allowing use of the structure described above as a logical device capable of providing a multiplicity of logical operations on binary information.

Accordingly, it is a prime object of this invention to provide a method of storing information in a magnetic ferrite element having different stable states of residual flux remanence, having a switching time of an order of magnitude lower than the switching times hitherto provided.

A further object of this invention is to provide a novel computer element.

Yet another object of this invention is to provide a novel computer element made of ferrite magnetic material which is adapted to be switched from one stable state to another by coherent rotational processes and to manifest an output indication in response to such switching.

Still a further object of this invention is to provide a novel element capable of manifesting a number of desired operations on binary information.

The foregoing and other objects, features and advantages of the invention will be apparent from the following more particular description of preferred embodiments of the invention, as illustrated in the accompanying drawings.

Figure 3A:
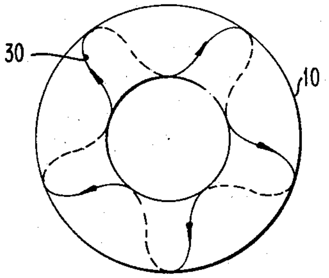
Figure 3B:
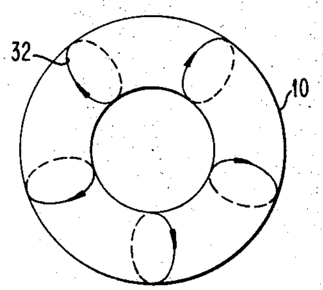
Figure 3C:
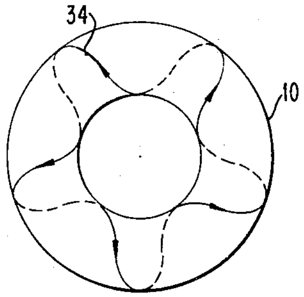

FIGS. 3*a–c* represent a dynamic flux pattern which takes place when coherent rotation switching is initiated.

Figure 1:
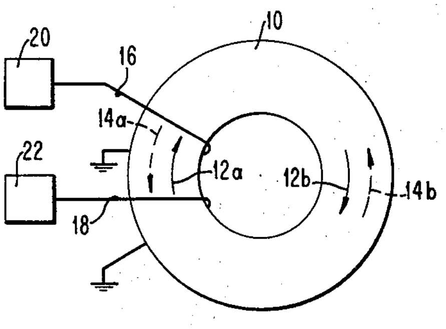
FIG. 1 is a schematic representation of a typical magnetc ferrite core.
Figure 4:
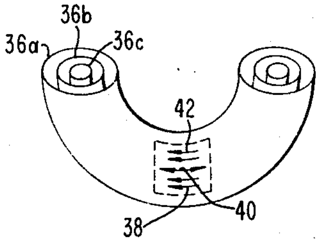

FIG. 4 represents a proposed theoretical configuration of the magnetic structure of FIG. 1.

FIG. 5 represents an embodiment of a computer element of this invention.

FIGS. 6*a–c* represent a fragmentary view of the element of FIG. 5 and the dynamic flux pattern during switching processes in accordance with this invention.

FIGS. 7*a–c* again illustrate a fragmentary view of the element of FIG. 5 and the dynamic flux pattern during switching processes in accordance with this invention.

FIG. 8 represents another embodiment of this invention.

Figure 9:
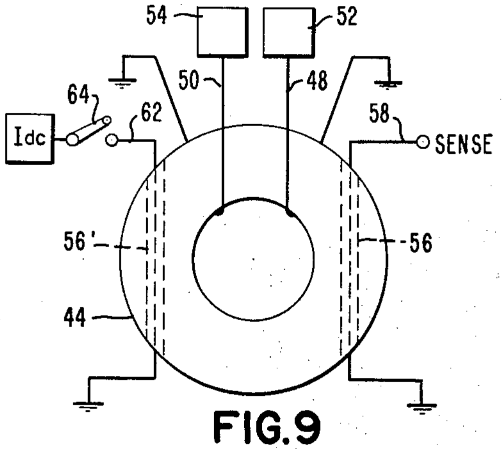

FIG. 9 represents still another embodiment of this invention.

Figure 10:
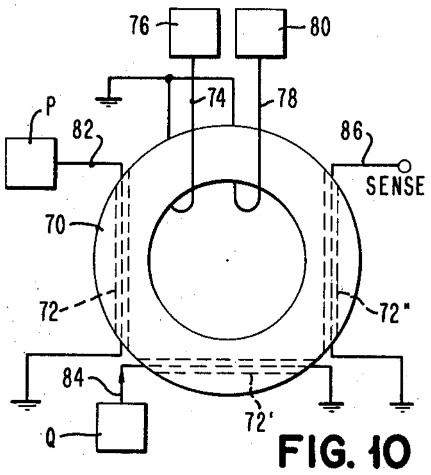

FIG. 10 represents yet another embodiment of this invention.

Figure 11:
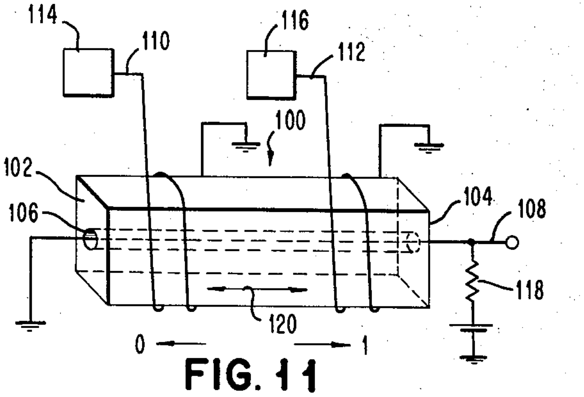

FIG. 11 represents another embodiment of this invention.

Figure 12B:
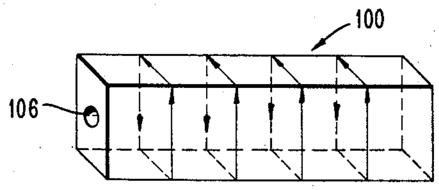
Figure 12A:
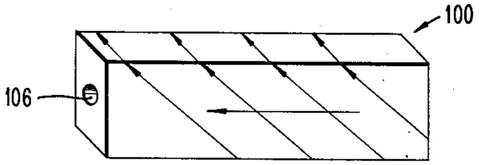
Figure 12C:
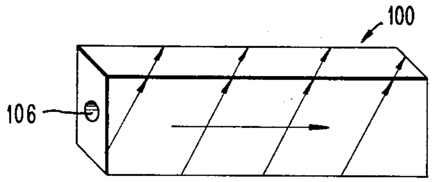

FIGS. 12*a–c* represent the dynamic flux pattern during switching processes of the embodiment of FIG. 11.

Figure 13:
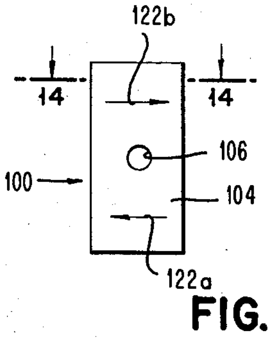

FIG. 13 is a side view of the element of FIG. 11.

Figure 14:
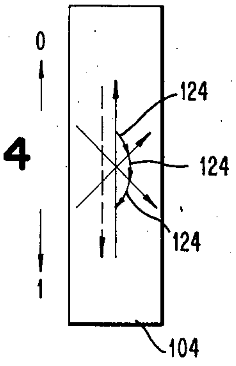

FIG. 14 illustrates the rotational behavior of flux within the structure of FIG. 11.

Generally, magnetic material may be considered as containing a multiplicity of small magnetically saturated regions called domains. In demagnetized materials these domains are randomly positioned so that the resultant magnetization of the specimen is zero. Changes in the magnetization may be accomplished by domain wall motion and rotational processes. Domain wall motion is generally a slow process in which changes in the magnetization occur by the growth of domains parallel to an applied field at the expense of domains oriented antiparallel with the applied field. In rotation, on the other hand, a magnetic moment, which is representative of the direction and magnitude of the magnetization of a domain, rotates similar to a compass needle in a given plane. Further, rotational process is classified as being either incoherent or coherent. Incoherent rotation is said to occur when substantially half the moments within a given material rotate in one direction while the remaining rotate in an opposite direction; i.e. half clockwise and the remaining counter-clockwise. Coherent rotation is said to occur when substantially all of the moments rotate in the same direction, i.e. substantially all clockwise or counterclockwise.

The different types of rotational mechanisms have been accomplished in thin film elements made of metallic magnetic material as described in a copending application Serial No. 813,561 and now U.S. Patent No. 3,054,094 which is assigned to the same assignee. In ferrite materials, more particularly those having the thickness of conventional magnetic storage elements, rotational processes involving the coherent mode have heretofore throught to be impossible, especially for such structures having a toroidal geometry; E. M. Gyorgy, "Rotational Model of Flux Reversal in Square-Loop Ferrites," Journal of Applied Physics, vol. 28, pp. 1011–1015, September 1957.

Referring to the FIG. 1 a typical core 10 is shown made of ferrimagnetic material such as a cadmium-manganese ferrite which exhibits the well known rectangular loop hysteresis characteristic. It should be kept in mind that although the toroidal shape is illustrated other geometries such as bars, cusps and the like will work equally as well and the toroidal shape is employed in order to illustrate the most difficult structure for coherent rotational processes. The different directions of remanent flux density within the core 10 are labelled by arrows 12 and 14 which represent the 0 and 1 binary conditions, respectively. Coupling the core 10 is a winding 16 and a winding 18, with the winding 16 connected to a pulse source 20 and the winding 18 connected to a pulse source 22.

Figure 2:
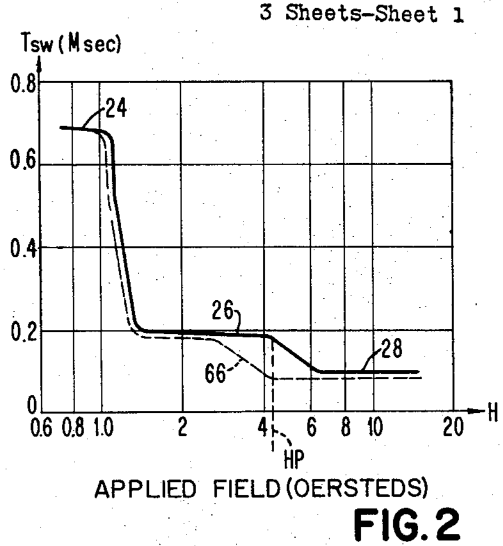
FIG. 2 represents a characteristic curve of the type material herein employed.

Referring now to the FIG. 2, a plot of switching constant, $T_{SW}$, represented in oersteds-microsecond, versus applied magnetic field, H, represented in oersteds, is shown for the material of the core 10 of FIG. 1. Referring to the FIGS. 1 and 2, assuming the core 10 to be in the 0 state, as indicated by the arrows 12, upon energization of the winding 16 by the source 20 such as to apply a field H antiparallel to the direction of remanent flux, the core 10 has its direction of flux reversed to the 1 state as indicated by arrows 14. The antiparallel applied field must be great enough to overcome the switching threshold or constant of the material before reversal of flux direction may take place. Similarly, the core 10 is returned to the 0 state upon energization of the winding 18 by the source 22. As may be seen with reference to the curve of FIG. 2, it has been found that as the magnitude of the applied antiparallel field H is increased the switching threshold or switching constant of the material decreases and three distinct segments of switching constant for the ferrite is observed and labelled 24, 26 and 28. These three segments are interpreted as due to the three different mechanisms of flux reversal discussed above. The experimental waveforms and switching times over the lower range of applied field are consistent with the theory of domain wall motion to which the segment 24 of switching threshold is attributed. The second segment of switching threshold 26 which appears at field intensities of from two to five times the wall-motion threshold is considered to be in agreement with a previously proposed incoherent rotational model described in the above cited article by E. M. Gyorgy. The third segment 28 appears at fields larger, by an order of magnitude, than the wall-motion threshold 24. Measured switching constants for various ferrites for this region of switching curve have been shown in the forementioned articles to fall within the range of from 0.04 to 0.20 oersted-microsecond. This decrease in switching time from the incoherent model is considered due to the onset of the coherent rotational mode.

The flux pattern produced upon onset of the rotational mode of coherent rotation is best described with reference to the FIG. 1 and FIGS. 3*a–c*. Considering the toroid 10 of FIG. 1, the direction of magnetization in its initial or residual state is neearly axial. Assuming the toroid 10 to be initially in the 0 state, when a field of sufficiently high intensity is applied, the flux configuration becomes a helical configuration 30 as shown in FIG. 3*a*. The reversal process then consists of the continuous change of pitch of the helix 30 of FIG. 3*a* from large negative values through zero, as shown in the FIG. 3*b*, wherein the flux pattern takes a shape of a plurality of rings 32, to large positive values as shown by the pitch of a flux pattern 34 in the FIG. 3*c*. It should be noted that flux closure through air is not required and further, for the same reasons as in the case of thin films, as described by an article entitled, "Magnetization Reversal and Thin Films" by D. O. Smith, appearing in the Journal of Applied Physics, vol. 29, No. 3, March 1958, pp 264–273, lower switching constants are expected for this coherent rotational model than for an incoherent model.

Compatability between rotational switching speeds as set forth in the related thin film article with ferrite structures such as shown in the FIG. 1 is enhanced by considering the toroid 10 of FIG. 1 as shown in the FIG. 4, Referring to FIG. 4, the solid toroid 10 of FIG. 1 may be considered to be composed of many concentric hollow toroids 36*a–c*, each of small wall thickness. In thin films, the direction of remanent flux density for anisotropic magnetic material is referred to as the "easy direction" and the easy direction is defined to be the resultant direction in which the magnetic moments within the material tend to lie, wherein opposite remanent directions are utilized to define binary information as is shown and described in the above cited copending application. Thus the easy direction of the core 10 of FIG. 1 may be considered as being axial, with the two possible directions defined by the arrows 12 and 14. Considering the core 10 of the FIG. 1 to be composed of a multiplicity of hollow toroids as shown in the FIG. 4, each having a small wall thickness, an incremental area 38 of the shell 36*a* of the FIG. 4 may be considered individually a thin film element. The area 38 is then seen to have an easy direction of magnetization 40 having a multiplicity of magnetic domains as represented by a number of magnetic moments 42. For the same reason that the area 38 of the fictitious shell 36*a* may be considered as acting like a thin film element, the total fictitious shell 36*a* is considered as acting somewhat similar to a thin film element. The pattern of flux reversal shown and described with reference to the FIGS. 1, 3*a–c*, would then take place in each of the fictitious shells 36*a–c*.

Referring to the FIG. 5, a preferred embodiment of this invention is shown. A toroidal core 44 is provided having a central aperture 46 whose axis is perpendicular to the plane of the drawing. The main flux path of the core 44 described by the total cross-sectional area of the core which is coupled by a winding 48 and a winding 50. Connected to the winding 48 is a generator 52 while similarly a generator 54 is connected to the winding 50. The core 44 is also provided with an aperture 56 whose center line passes through a central portion of the main flux path of the core 44 which is orthogonal to the axis of the main aperture 46. Threading through the aperture 56 is a sense winding 58 having a bias means 60 connected in parallel therewith.

In considering operation of the embodiment of FIG. 5, the sources 52 and 54 will be utilized to coincidently energize the windings 48 and 50, respectively, with pulses of predetermined magnitude of first one polarity, to write a 1 into the core 44, and then an opposite polarity, to write a 0 or read the 1 in the core 44 by coherent rotational reversal of the magnetization. It is obvious, however, that any one of the windings 48 or 50 with its associated generator 52 or 54 may be utilized to write a 1 while the other may be utilized to read the 1 and reset the core 44 to 0. For a complete understanding of the flux patterns believed to be provided when switching coherently from one stable magnetic state to another reference will be made to the FIGS. 6*a–c* and 7*a–c* which will subsequently be described in detail.

Referring to the FIGS. 6 and 7 an oblique cross-sectional view of the core 44 of the FIG. 5 is shown with the aperture 56 centrally located in a portion of the main flux path of the core. The FIGS. 6 and 7 are employed to illustrate the different flux patterns which may take place when changes in flux direction due to coherent rotational processes take place, namely a change from the 0 to the 1 stable state and from 1 to 0. Specifically referring to the FIGS. 6*a* and 6*b*, assuming the core 44 were in the 0 state and the windings 48 and 50 were coincidently energized to provide a field antiparallel to the counter-clockwise direction of remanent flux, a helical flux pattern 62, as described with reference to the FIGS. 3*a–c*, is set up. The pattern shown in the FIG. 6*a* takes on the pattern shown in the FIG. 6*b* and then relaxes to an axial direction which is clockwise, describing the 1 state. Note that the direction of flux about the aperture 56 is clockwise, as indicated by arrows 64*a* and 64*b*, similar to the helical flux pattern 62. A small area 66 adjacent the aperture 56 of the core 44 is shown in enlarged form in the FIG. 6*c*. The left side of the area 66 in the FIG. 6*c* is the side conforming with the sectional surface of the toroid 44 of the FIG. 6*b*. The section 66 is shown having an easy direction of magnetization 68, the direction from left to right being the 0 state, which conforms with the axial direction of FIGS. 1 and 5, while the direction from right to left is the 1 state. Initially, the core 44 was considered as being in the 0 state and upon application of a predetermined field to be switched from the 0 to the 1 state as set forth in FIGS. 6*a* and 6*b*. The resultant magnetization of the incremental area 66 is first described as being in the 0 state and then rotated as indicated to the 1 state. It may be seen that since the resultant magnetization is rotated as indicated, the sense winding 58 experiences this change of flux and thus a voltage may be induced on the winding 58 since it is wound substantially parallel with at least a portion of the easy direction of the core 44 as perceived by the easy direction 68 of the area 66. Thus the resultant magnetization of the magnetic moments of the area 66 is rotated clockwise from one stable direction to another. Similarly, the FIGS. 7*a–c* illustrate the theoretical flux pattern when the direction of remanent flux within the core 44 is changed from the 1 to the 0 direction by coherent rotational processes. Note that the direction of flux about the aperture 56 is now counterclockwise.

Referring again to the FIGS. 6*c* and 7*c*, the resultant magnetization vector of the magnetic moments is shown to rotate from one remanent or stable direction clockwise to another remanent direction. The same end result would be accomplished if, in the FIG. 6*c*, the moments were rotated counter-clockwise to the 1 state and, in the FIG. 7*c* similarly, if the moments were rotated counter-clockwise. Thus it makes no difference in which sense the moments are rotated.

Considering again the theoretical configuration of shells as described above for the FIG. 4, wherein the material in being subjected to a predetermined field has its magnetization reversed by coherent rotation, each of the shells 36 of the FIG. 4 is considered to have its direction of flux reversed in accordance with the coherent rotational flux patterns shown in the FIGS. 6 and 7. However, while each shell experiences a coherent rotation of the resultant magnetic vectors, in one shell the magnetic moments may rotate clockwise while in the other shell they may rotate counter-clockwise as described above. This in fact is believed to be the case, since, in the FIG. 5, if the bias 60 is removed, a negligible signal is induced in the sense winding 58. By means of the bias 60, in the FIG. 5, a very small field is applied transverse to the easy direction of the core 44 which insures rotation of the magnetic moments throughout the structure in a given direction. Thus, by means of the bias 60, when the direction of flux within the core 44 is reversed by coherent rotational processes a detectable signal is induced on the sense winding 58. It should be noted that although the bias 60 is shown in a given polarization direction, the reverse direction works equally as well since this will ensure uniform rotation in an opposite direction. Thus the field necessary to cause uniform rotation is a resultant applied field made up of both a parallel and a transverse field applied to the easy direction of the core 44.

Referring to the FIG. 8, the structure of FIG. 5 is shown and where appropriate the same reference numerals are utilized. In the FIG. 8 the core 44 is again shown having the central aperture 46 and windings 48 and 50 connected with the sources 52 and 54, respectively. The aperture 56 is now shown having the sense winding 58 and a control winding 62 connected to a bias source $I_{dc}$ through a switch 64 which may be a relay, tube, transistor or any other suitable switching means. Since the function of the bias 60 in the FIG. 5 is to provided a field transverse to the easy direction of the core 44, the winding 62 when energized by the source $I_{dc}$ upon closure of the switch 64 provides a similar function. The means for providing the transverse field to the core 44 may be considered as an inhibitor, that is, an input to a device which decides whether a logical function otherwise manifested by a predetermined input condition will be inhibited from deriving an output. Therefore the operation of the device of FIG. 8 may be considered to be the achieving of a non-commutative operator, i.e. a logical operator wherein the output manifests a relationship not only of the number of particular inputs but also of which one of the particular inputs (the inhibitor). The logical aspects of non-commutativity are fully described in co-pending applications Serial Nos. 654,035, filed April 4, 1957, and 611,922, filed September 25, 1956, and now U.S. Patent No. 3,028,088, and assigned to the assignee of this application.

Referring again to the FIG. 2 and the FIG. 8, if the field applied parallel to the easy axis of residual magnetization of the core 44 is greater than a value $H_p$, then reversal of magnetization takes place by coherent rotational processes as described above. To provide coincident selection techniques, a first selection line, say the winding 48, may deliver a field $H_p$ while a second selection line is utilized to deliver a similar field $H_p$ which conjointly provides a field greater than $H_p$ to cause reversal by coherent rotational processes.

Still referring to the FIG. 2, it has been found that by increasing the magnitude of the transverse field in the structure of FIG. 5 or FIG. 8, that the switching constant curve is displaced toward the left as is shown by a dotted curve 66. As the intensity of the transverse field is increased, the curve 66 shows greater displacement toward the left. Consider then that in the FIG. 8, two selection lines 48 and 50 are energized to conjointly provide a field equal to $H_p$ in the FIG. 2. Upon operation of the switch 64, the switching curve is moved toward the left and assumes the position of the dotted curve 66. With the transverse field applied by the operation of the switch 64 and the application of the field $H_p$, coherent rotational process of flux reversal is established.

Another embodiment of this invention is shown in the FIG. 9 wherein the ferrite core 44 is again provided as is shown in the FIG. 8 having an additional aperture 56′ removed from the aperture 56. For ease of presentation, the same reference numerals are utilized where possible. As may be seen, the aperture 56 is now provided with the sense winding 58 only while the further aperture 56′ is threaded by the winding 62 having one end connected to ground and the other end connected to the source $I_{dc}$ through the switch 64. It is the purpose of the structure of FIG. 9 to provide a means by which interaction between the windings 62 and 58 shown in the FIG. 8 may be avoided. The operation of the circuit of the structure of FIG. 9 is exactly as described for the structure of FIG. 8 with the additional provision of decoupling.

Referring to the FIG. 10, another embodiment of this invention is shown wherein a ferrite core 70 is provided having a plurality of apertures 72, 72′ and 72″ each located in a central portion of the flux path defined by the material of the core 70. Again, the core 70 is made of ferrite material capable of attaining different stable residual states of magnetic flux density and the remanent directions are axial as is shown in the FIG. 1. Coupling the total flux path of the core 70 is a reset winding 74 connected to a generator 76 and a set winding 78 connected to a pulse generator 80. It is the function of the winding 74 when energized by the source 76 to switch the direction of flux of the core 70 coherently from the 0 to the 1 state while the function of the reset winding 78 is to reset the core 70 when energized by the source 80 to the 0 state. Threading the aperture 72 is an input winding 82 which is connected to a source of information pulses labelled P while similarly threading the aperture 72' is an input winding 84 connected to a source of information pulses labelled Q. A sense winding 86 is provided threading the aperture 72'' which is adapted to provide an output signal when the core has its flux reversed uniformly from one stable state to another under control of the energization of the windings 82 or 84. In accordance with the discussion above for the structure of FIG. 8, it was shown that although a ferrite structure may have its direction of magnetization reversed by coherent rotational processes, it is only when a transverse field, energization of the winding 62 of the FIG. 8, or 62' of the FIG. 9, is present that a signal is provided on the output sense line 86. If, then, the winding 74 is periodically energized by the source 76 to provide a field great enough to cause the core 70 to have its flux direction reversed by coherent rotational processes, an output will be provided on the sense winding 86 only if either or both of the windings 82 and 84 are energized by an input from P or Q, respectively. The structure of the FIG. 10 then allows construction of a novel OR circuit, since if either or both of resources P and Q are provided, an output is provided on the line 86. This embodiment is shown by way of example only since other logical manifestations may be provided by sophistication of winding techniques and switching modes. It should be realized, however, that the embodiments of this invention allow construction of devices not only wherein non-commutative type logic may be performed, but also commutative logic wherein the variable inputs themselves provide the transverse field as is shown in FIG. 10.

As another embodiment of this invention, reference is made to the FIG. 11, wherein a slab of ferrimagnetic material such as ferrite 100 is shown having end surfaces 102 and 104. The slab 100 is provided with an aperture 106 centrally located within the material of the slab having a winding 108 provided therethrough. The slab 100 is also provided with a winding 110 and a winding 112 each connected with a pulse generator 114 and 116, respectively. A biasing means 118 is provided connected with the winding 108. As may be perceived, the winding 108 with the biasing means, is comparable to the winding 58 having the biasing means 60, shown in the FIG. 5. Further, the windings 110 and 112 are comparable to the windings 50 and 48 as are their associated generator sources. The slab 100 is made of magnetic material having a square loop hysteresis characteristic and may be considered, as described above, as having an easy direction of magnetization 120, wherein the direction from right to left is defined as the 0 stable state and the opposite direction is defined as the 1 stable state.

Referring to the FIGS. 12*a–c*, the theoretical flux patterns are shown for the structure for the FIG. 11 when coherent rotational switching is initiated in the slab 100 to reverse the direction of flux from the 0 to the 1 stable state. The flux patterns shown in the FIGS. 12*a–c* may be correlated to the flux patterns shown in the FIGS. 3*a–c* in that when a field of sufficiently high intensity is applied by energization of the windings 110 and 112, the flux configuration becomes helical in nature and consists of a continuous change of pitch of the helix from a large negative value as is shown in the FIG. 12*a* through zero as is shown in the FIG. 12*b* wherein a plurality of rings is described. Thereafter the flux pattern takes on positive values as is shown by the pitch of the flux in the FIG. 12*c*. Again, it should be noted that flux closure through air is not required.

Referring to the FIG. 13, an end view of the slab 100 of the FIG. 11 is shown. In accordance with the rotation pattern shown in the FIG. 6*b*, the pitch is seen to be counter-clockwise about the aperture 106 as is noted by arrows 122*a* and 122*b*. Taking a sectional view of the slab 100 in the FIG. 13, the magnetization reversal within the slab 100 may be shown in the FIG. 14.

Referring to the FIG. 14, assuming that the direction of magnetization within the slab 100 was initially in the 0 state, as stated above, the magnetization is seen to reverse by rotational switching as indicated by arrows 124. Again similarity of this rotational pattern with that shown in the FIGS. 6*c* and 7*c* is apparent and as stated with reference to the FIGS. 6*c* and 7*c* the magnetic moments of the element 100 may be rotated from one stable state to another either clockwise or counter-clockwise with the shell configuration shown in the FIG. 4 equally adapted to the slab 100. Therefore it becomes apparent that again the small transverse field is necessary to provide an output signal on the sense winding 108 when coherent rotational processes are utilized. It is also obvious that the arrangement of FIG. 8 is equally adaptable to the arrangement of FIG. 11 as are the arrangements of FIGS. 9 and 10.

In the interest of providing a complete disclosure, details of the embodiment of FIG. 5 are given below, however, it should be understood that other component value and current magnitudes may be employed with satisfactory operation attained so that the values given should not be considered limiting.

The cores employed may comprise toroids having an outside diameter of 0.080 inch, an inside diameter of 0.050 inch and a thickness of 0.028 inch, with the aperture through the side of the toroid of 0.006 inch in diameter. The sense winding 58 may comprise one turn with the bias 60 delivering a current of 26 milliamperes with the windings 48 and 50 delivering half select fields of 0.5 ampere-turns when energized of a duration of 0.05 micro-second.

In considering the detailed explanation of the various embodiments of this invention related above, it is immediately obvious that the sense winding 58 in the FIG. 5 would have a larger signal induced thereon if it were centrally located in the material of the core 44. This then would necessitate an aperture centrally located within the core 44 in alignment with the easy direction thereof describing a circular aperture. Although such a structure would in fact provide a greater output signal, difficulties in fabrication arise since the cores normally employed have small cross-sectional areas and to provide such an aperture would prove too costly and burdensome from a manufacturing standpoint.

While the invention has been particularly shown and described with reference to preferred embodiments thereof, it will be understood by those skilled in the art that various changes in form and details may be made therein without departing from the spirit and scope of the invention.

What is claimed is:

1. A computer device comprising, a coherently switchable element of given shape made of ferrimagnetic material capable of attaining different stable states of remanent flux density and having a plurality of magnetic moments, said element exhibiting an easy direction of magnetization determined solely by the shape of said element along which said moments tend to align themselves defining different directions of remanent flux, orientation input winding means coupling said element for applying a field of predetermined magnitude parallel to the easy direction thereof to coherently rotate the magnetic moments of said material from one remanent orientation state to another and a biased sense winding coupling a portion of the material of said element and wound in alignment with the easy direction thereof for both causing the coherent rotation of said magnetic moments to be uniform and for providing an output signal indicative of a flux change therein.

2. A computer device comprising a coherently switchable element of given shape made of ferrimagnetic material having a plurality of magnetic moments and exhibiting a substantially rectangular hysteresis characteristic, said element exhibiting an easy direction of magnetization determined solely by the shape of said element and along which said moments tend to align themselves to define opposite stable states of remanent flux orientation, an output winding coupling said element and having at least a portion thereof wound in alignment with the easy direction thereof, and means for applying a first field parallel to the easy direction of said element to coherently rotate the moments of said material from one remanent orientation state to another and for coincidently applying a second field transverse to the easy direction of said element to cause the coherent rotation of said moments to be uniform whereby a signal is induced on said output winding.

3. A computer device comprising a coherently switchable magnetic element of given shape made of ferrimagnetic material having a plurality of magnetic moments and exhibiting different stable states of remanent flux orientation; said element further exhibiting an easy direction of magnetization determined solely by the shape thereof; switching means coupling said element for uniformly rotating the magnetic moments of said material and switching said element from one stable state to another comprising: means for applying a first field parallel to the easy direction of said element to coherently switch said element from said one to said other stable state, and means for coincidently applying a field transverse to said first field; and an output winding coupling at least a portion of said element and wound in alignment with at least a portion of the easy direction thereof.

4. The device as set forth in claim 3, wherein the material of said element defines only a portion of a closed magnetic flux path.

5. The device as set forth in claim 3, wherein the material of said element defines a closed magnetic flux path.

6. In a circuit, a magnetic element of given shape made of ferrimagnetic material having a plurality of magnetic moments and exhibiting a substantially rectangular hysteresis characteristic, said element exhibiting an easy direction of magnetization determined solely by the shape of said element and along which said moments tend to align themselves to define a first and a second stable state of remanent flux orientation, an output winding coupling at least a portion of said element and wound in alignment with at least a portion of the easy direction thereof, and means coincidently applying a first field to said element directed parallel with respect to the easy direction thereof and a second field directed transverse with respect to said first field for uniformly rotating all the magnetic moments of said material from the first to said second stable state and induce, thereby, a signal on said output winding.

7. A computer device comprising a coherently switchable magnetic core of given shape made of ferrimagnetic material having a plurality of magnetic moments and exhibiting a substantially rectangular hysteresis characteristic, said core exhibiting an easy direction of magnetization defined solely by the shape thereof and along which said moments tend to align themselves to define opposite stable states of remanent flux orientation, input means coupling said element for applying a field of predetermined magnitude parallel to the easy direction of said element to coherently rotate said moments from one stable remanent state to another, and a biased output winding centrally located within said core and in alignment with the easy direction thereof for both applying a field transverse to the easy direction of said core to cause said moments to rotate uniformly and for providing an induced output indicative of a flux change in said core.

8. A computer device comprising a coherently switchable magnetic core having an elongated shape made of ferrimagnetic material having a plurality of magnetic moments and exhibiting a substantially rectangular hysteresis loop, said core exhibiting an easy direction of magnetization determined solely by the shape of said element which is along the elongated axis thereof, input means coupling said core for applying a field of predetermined magnitude parallel to the easy direction of said core to coherently rotate the moments of said material from a first remanent stable state of flux orientation along said easy direction to an opposite remanent stable state of flux oriented along said easy direction, and a biased sense winding centrally located in said core in alignment with the easy direction thereof for applying a field to said core transverse with respect to the easy direction thereof to uniformly rotate all the moments of said material when coherently rotated and for providing an induced voltage indicative of a flux change in said core.

References Cited in the file of this patent

UNITED STATES PATENTS

| | | |
|---|---|---|
| 2,810,901 | Crane | Oct. 22, 1957 |
| 2,811,652 | Lipkin | Oct. 29, 1957 |

OTHER REFERENCES

"A Compact Coincident-Current Memory," by Pohm and Rubens, "Proceedings of Eastern Joint Computer Conference," Dec. 10 to 12, 1956, pp. 120–123.

"New Developments in Magnetic Materials and Applications," by W. Arrott, "Electrical Manufacturing," February 1959, pp. 56–60.